United States Patent
Park et al.

(10) Patent No.: US 12,456,461 B2
(45) Date of Patent: Oct. 28, 2025

(54) ELECTRONIC APPARATUS FOR PROCESSING USER UTTERANCE AND CONTROLLING METHOD THEREOF

(71) Applicant: Samsung Electronics Co., Ltd., Suwon-si (KR)

(72) Inventors: Sangmin Park, Suwon-si (KR); Jaeyung Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 212 days.

(21) Appl. No.: 17/869,411

(22) Filed: Jul. 20, 2022

(65) Prior Publication Data

US 2022/0358925 A1 Nov. 10, 2022

Related U.S. Application Data

(63) Continuation of application No. PCT/KR2021/015453, filed on Oct. 29, 2021.

(30) Foreign Application Priority Data

Oct. 29, 2020 (KR) ........................ 10-2020-0142314

(51) Int. Cl.
*G10L 15/22* (2006.01)
*G06F 3/16* (2006.01)
*G10L 15/30* (2013.01)

(52) U.S. Cl.
CPC .............. *G10L 15/22* (2013.01); *G06F 3/167* (2013.01); *G10L 15/30* (2013.01); *G10L 2015/223* (2013.01); *G10L 2015/228* (2013.01)

(58) Field of Classification Search
CPC ... G10L 15/22; G10L 15/30; G10L 2015/223; G10L 2015/228; G10L 15/04; G10L 2015/225; G06F 3/167; G06F 3/16
See application file for complete search history.

(56) References Cited

U.S. PATENT DOCUMENTS 8,838,072 B2 9/2014 Sawhney et al.
10,462,568 B2 10/2019 Cho et al.
(Continued)

FOREIGN PATENT DOCUMENTS

KR 10-2013-0018105 2/2013
KR 10-2013-0127901 11/2013
(Continued)

OTHER PUBLICATIONS

International Search Report for PCT/KR2021/015453 dated Feb. 21, 2022, 3 pages.
(Continued)

*Primary Examiner* — Richemond Dorvil
*Assistant Examiner* — Zeeshan Mahmood Shaikh
(74) *Attorney, Agent, or Firm* — Nixon & Vanderhye P.C.

(57) ABSTRACT

An electronic device according to an embodiment of the invention includes: a microphone; a memory storing a plurality of domain sets; and at least one processor electrically connected to the microphone and the memory, wherein the at least one processor is configured to: acquire a voice signal using the microphone; acquire context information associated with at least one of the electronic device or a user; determine a first domain set of the plurality of domain sets based on at least the context information; and perform an operation corresponding to the voice signal based on the determined first domain set.

20 Claims, 14 Drawing Sheets

(56) References Cited

U.S. PATENT DOCUMENTS

| | | | |
|---|---|---|---|
| 10,475,451 B1* | 11/2019 | Lynch | G10L 15/22 |
| 10,521,514 B2 | 12/2019 | Lee et al. | |
| 11,244,675 B2 | 2/2022 | Naganuma | |
| 2013/0297304 A1 | 11/2013 | Kim et al. | |
| 2015/0348565 A1* | 12/2015 | Rhoten | G06F 16/243 |
| | | | 704/270.1 |
| 2017/0160813 A1* | 6/2017 | Divakaran | G10L 15/22 |
| 2018/0174580 A1 | 6/2018 | Kim et al. | |
| 2020/0193983 A1 | 6/2020 | Choi | |
| 2020/0242198 A1* | 7/2020 | Ji | G10L 15/16 |

FOREIGN PATENT DOCUMENTS

| | | |
|---|---|---|
| KR | 10-2016-0132748 | 11/2016 |
| KR | 10-2016-0142802 | 12/2016 |
| KR | 10-2018-0070970 | 6/2018 |
| KR | 10-2020-0034430 | 3/2020 |
| KR | 10-2020-0072907 | 6/2020 |
| KR | 10-2411619 | 6/2022 |

OTHER PUBLICATIONS

Written Opinion of the ISA for PCT/KR2021/015453 dated Feb. 21, 2022, 4 pages.

\* cited by examiner

ELECTRONIC APPARATUS FOR PROCESSING USER UTTERANCE AND CONTROLLING METHOD THEREOF

CROSS-REFERENCE TO RELATED APPLICATIONS

This application is a continuation of International Application No. PCT/KR2021/015453 designating the United States, filed on Oct. 29, 2021, in the Korean Intellectual Property Receiving Office and claiming priority to Korean Patent Application No. 10-2020-0142314, filed on Oct. 29, 2020, in the Korean Intellectual Property Office, the disclosures of which are incorporated by referent herein in their entireties.

BACKGROUND

Field

The disclosure relates to an electronic device that provides a voice service based on information associated with at least one of an electronic device and a user, and an operating method thereof.

Description of Related Art

Recently, the number of electronic devices providing a speech recognition function is increasing. An electronic device, which can recognize user's utterance, may execute a function (e.g., an application installed in the electronic device) built therein to provide a service to the user and also provide the related service through various 3rd party service providers.

In order to execute a speech recognition function built into the electronic device, the electronic device needs to store a speech recognition service-related model, various resources, a database, and the like.

Recently, a speech recognition service is being developed based on a technology for processing natural language. The natural language processing technology is a technology that recognizes the intent of a user's utterance and provides a result matching the intent to the user.

Due to a limitation of hardware resources, an electronic device providing a speech recognition function may process only a limited number of user utterances. The electronic device may transmit user utterances other than the limited number of user utterances to an external server and may receive responses to the user utterances, thereby processing the received user utterances. Accordingly, the processing speed of the user utterance may be delayed. In addition, the user may use the speech recognition service through various utterances. Even if the user utterance is the same, it may be interpreted as various intents according to the utterance time, the location of the user, and the occupation of the user. Accordingly, it is difficult to improve the accuracy of the voice recognition service in a method of providing a voice recognition function based on only the user's utterance.

In order to provide a voice recognition function, various types of data (e.g., resource, database, and voice recognition related model) that the electronic device must store therein have a significant size. The data consumes a storage space of the electronic device, and the download cost for data for providing a voice recognition function and the burden of updating the data are relatively large.

SUMMARY

An electronic device according to an example embodiment includes: a microphone; a memory storing a plurality of domain sets; and at least one processor electrically connected to the microphone and the memory, wherein the at least one processor is configured to: acquire a voice signal using the microphone; acquire context information associated with at least one of the electronic device or the user; determine a first domain set of the plurality of domain sets based on at least the context information; and perform an operation corresponding to the voice signal based on the determined first domain set.

A method of operating an electronic device according to an example embodiment includes: acquiring a voice signal using a microphone of an electronic device; acquiring context information associated with at least one of the electronic device and the user; determining a first domain set among a plurality of domain sets stored in a memory of the electronic device based on at least the context information; and performing an operation corresponding to the voice signal based on the determined first domain set.

An electronic device according to an example embodiment includes: a microphone; a memory storing a plurality of domain sets; a communication circuit configured to communicate with a server; and at least one processor electrically connected to the microphone and the memory, wherein the at least one processor is configured to: acquire a voice signal using the microphone; acquire context information associated with at least one of the electronic device or the user; receive, from the server, the context information and a first domain set corresponding to the voice signal using the communication circuit; store the first domain set in the memory; and perform an operation corresponding to the voice signal based on the first domain set.

By an electronic device and an operating method thereof according to various example embodiments, a domain set selected by a user from a server may be stored in the electronic device to enable provision of a voice service based on a user history and preference, thereby increasing a user utterance processing speed. In addition, the user may download a necessary domain set selected by a user and may download and update a related voice service, thereby enabling efficient management of a memory included in an electronic device.

In an electronic device and an operating method thereof according to various example embodiments, the intent of a user's utterance may be determined within a limited set of domains downloaded by user selection using context information including various types of information such as the location of the electronic device, the day of the week, the user's occupation, and the like. Therefore, the disclosure can provide a high-accuracy voice service.

BRIEF DESCRIPTION OF THE DRAWINGS

The above and other aspects, features and advantages of certain embodiments of the present disclosure will be more apparent from the following detailed description, taken in conjunction with the accompanying drawings, in which.

In connection with the description of the drawings, the same or similar reference numerals may be used for the same or similar components.

DETAILED DESCRIPTION

Figure 1:
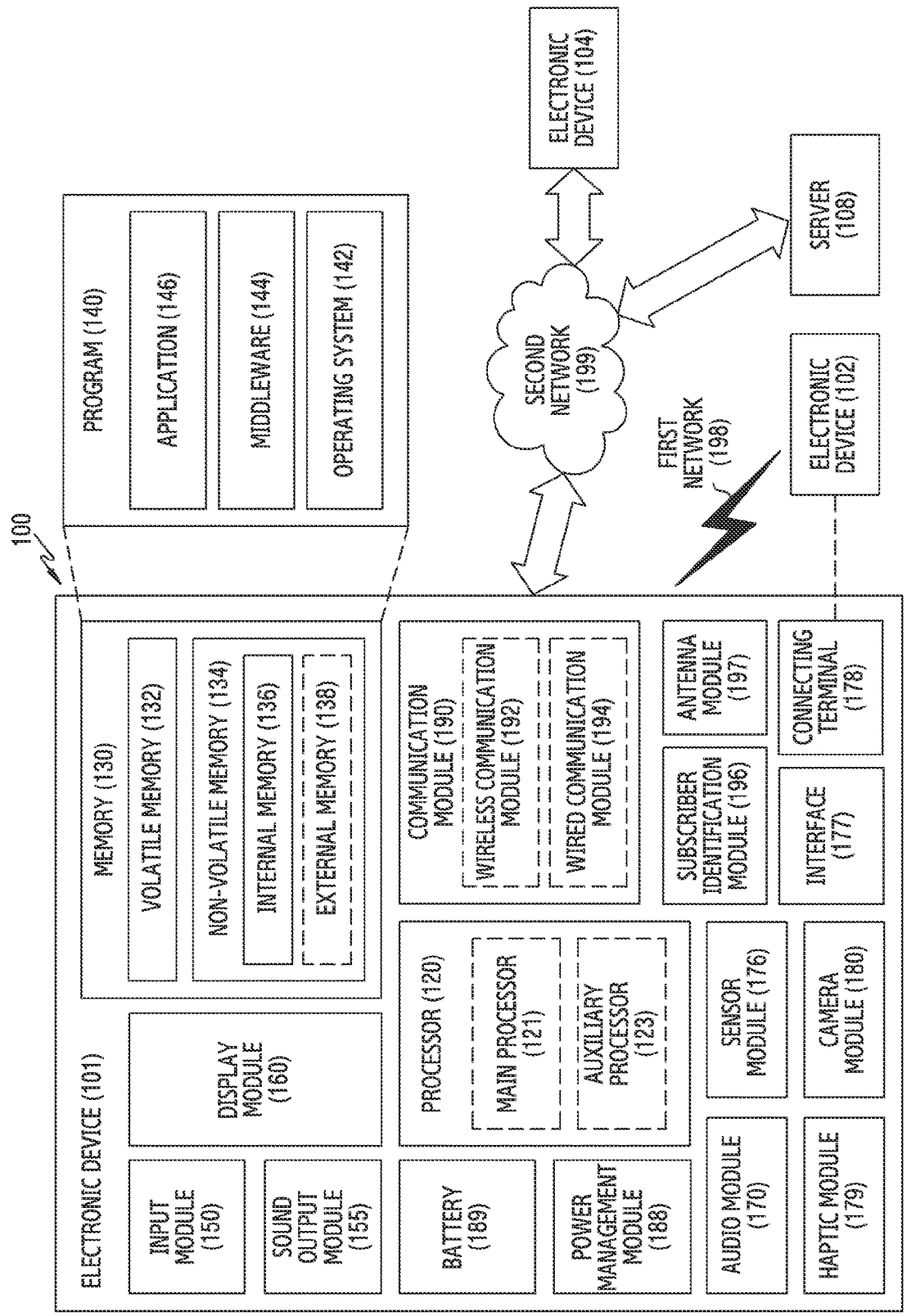
FIG. 1 is a block diagram illustrating an electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
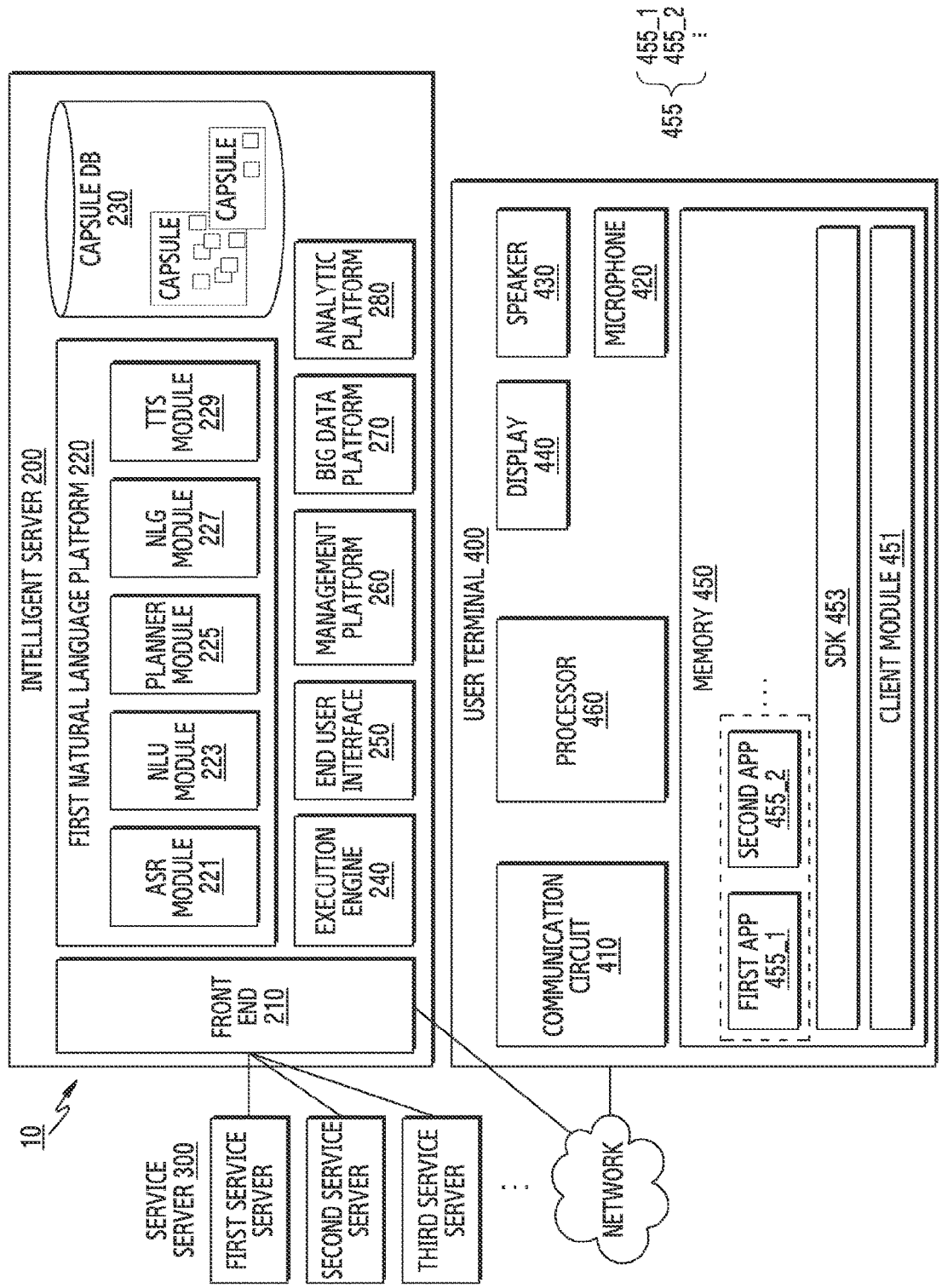
FIG. 2 is a block diagram illustrating an example integrated intelligence (AI) system according to various embodiments.

FIG. 2 is a block diagram illustrating an example integrated intelligence (AI) system according to various embodiments.

Referring to FIG. 2, an AI system 10 according to an embodiment may include a user terminal 400, an intelligent server 200, and a service server 300.

The user terminal 400 of an embodiment may be a terminal device (or electronic device) connectable to the Internet, for example, a mobile phone, a smart phone, a personal digital assistant (PDA), a notebook computer, a TV, a white home appliance, a wearable device, an HMD, or a smart speaker.

According to the illustrated embodiment, the user terminal 400 may include a communication circuit 410, a microphone 420, a speaker 430, a display 440, a memory 450, or a processor (e.g., including processing circuitry) 460. The components listed above may be operatively or electrically connected to each other.

The communication circuit 410 according to an embodiment may be configured to transmit/receive data by being connected to an external device. The microphone 420 according to an embodiment may receive a sound (e.g., a user's utterance) and convert the received sound into an electrical signal. The speaker 430 according to an embodiment may output an electrical signal as a sound (e.g., voice). The display 440 according to an embodiment may be configured to display an image or video. The display 440 according to an embodiment may also display a graphic user interface (GUI) of an executed app (or an application program).

The memory 450 according to an embodiment may store a client module 451, a software development kit (SDK) 453, and a plurality of apps 455. The client module 451 and the SDK 453 may comprise a framework (or a solution program) for performing a general function. In addition, the client module 451 or the SDK 453 may comprise a framework for processing a voice input.

In the memory 450 according to an embodiment, the plurality of apps 455 may be a program for performing a specified function. According to an embodiment, the plurality of apps 455 may include a first app 455_1 and a second app 455_2. According to an embodiment, each of the plurality of apps 455 may include a plurality of actions for performing a specified function. For example, the apps may include an alarm app, a message app, and/or a schedule app. According to an embodiment, the plurality of apps 455 may be executed by the processor 460 to sequentially execute at least some of the plurality of actions.

The processor 460 according to an embodiment may include various processing circuitry and control the overall operation of the user terminal 400. For example, the processor 460 may be electrically connected to the communication circuit 410, the microphone 420, the speaker 430, and the display 440 to perform a designated operation.

The processor 460 according to an embodiment may also execute a program stored in the memory 450 to perform a designated function. For example, the processor 460 may execute at least one of the client module 451 and the SDK 453 to perform the following operation for processing a voice input. The processor 460 may control the operation of the plurality of apps 455 through, for example, the SDK 453. The following operation described as the operation of the client module 451 or the SDK 453 may be operation by the execution of the processor 460.

The client module 451 according to an embodiment may receive a voice input. For example, the client module 451 may receive a voice signal corresponding to the user's utterance sensed through the microphone 420. The client module 451 may transmit the received voice input to the intelligent server 200. The client module 451 may transmit state information of the user terminal 400 to the intelligent server 200 together with the received voice input. The state information may be, for example, execution state information of an app.

The client module 451 according to an embodiment may receive a result corresponding to the received voice input. For example, when the intelligent server 200 can calculate a result corresponding to the received voice input, the client module 451 may receive the result corresponding to the received voice input. The client module 451 may display the received result on the display 440.

The client module 451 according to an embodiment may receive a plan corresponding to the received voice input. The client module 451 may display results of executing a plurality of actions of the app according to the plan on the display 440. The client module 451 may, for example, sequentially display execution results of a plurality of actions on a display. As another example, the user terminal 400 may display only some (e.g., a result of the last operation) of the results of executing the plurality of actions on the display.

According to an embodiment, the client module 451 may receive a request for obtaining information necessary for calculating a result corresponding to a voice input from the intelligent server 200. According to an embodiment, the client module 451 may transmit the necessary information to the intelligent server 200 in response to the request.

The client module 451 according to an embodiment may transmit result information of executing the plurality of actions according to the plan to the intelligent server 200. The intelligent server 200 may confirm that the received voice input is correctly processed using the result information.

The client module 451 according to an embodiment may include a voice recognition module. According to an embodiment, the client module 451 may recognize a voice input performing a limited function through the voice recognition module. For example, the client module 451 may execute an intelligent app for processing a voice input for performing an organic operation through a specified input (e.g., "Wake up!").

The intelligent server 200 according to an embodiment may receive information related to a user's voice input from the user terminal 400 through a communication network. According to an embodiment, the intelligent server 200 may change data related to the received voice input into text data. According to an embodiment, the intelligent server 200 may generate a plan for performing a task corresponding to the user's voice input based on the text data.

According to an embodiment, the plan may be generated by an artificial intelligent (AI) system. The AI system may be a rule-based system or a neural network-based system (e.g., a feedforward neural network (FNN) or a recurrent neural network (RNN)). The AI system may be a combination of the above or other artificial intelligence systems. According to an embodiment, the plan may be selected from a set of predefined plans or may be generated in real time in response to a user request. For example, the AI system may select at least a plan from among a plurality of predefined plans.

The intelligent server 200 according to an embodiment may transmit a result according to the generated plan to the user terminal 400 or transmit the generated plan to the user terminal 400. According to an embodiment, the user terminal 400 may display the result according to the plan on the display. According to an embodiment, the user terminal 400 may display a result of executing an operation according to the plan on the display.

The intelligent server 200 according to an embodiment may include a front end 210, a first natural language platform 220, a capsule DB 230, an execution engine 240, an end user interface 250, a management platform 260, a big data platform 270, or an analytics platform 280.

The front end 210 according to an embodiment may receive a voice input received from the user terminal 400. The front end 210 may transmit a response corresponding to the voice input.

According to an embodiment, the first natural language platform 220 may include an automatic speech recognition module (ASR module) 221, a natural language understanding module (NLU module) 223, a planner module 225, a natural language generator module (NLG module) 227, or a text to speech module (TTS module) 229.

The ASR module 221 according to an embodiment may convert the voice input received from the user terminal 400 into text data. The NLU module 223 according to an embodiment may determine the user's intent using text data of the voice input. For example, the NLU module 223 may determine the user's intent by performing syntactic analysis or semantic analysis. The NLU module 223 according to an embodiment may determine the meaning of a word extracted from the voice input using a linguistic feature (e.g., a grammatical element) of a morpheme or phrase, and may match the determined meaning of the word with the intent, thereby determining the user's intent.

The planner module 225 according to an embodiment may generate a plan using the intent determined by the NLU module 223 and parameters. According to an embodiment, the planner module 225 may determine a plurality of domains required to perform a task based on the determined intent. The planner module 225 may determine a plurality of actions included in each of the plurality of domains determined based on the intent. According to an embodiment, the planner module 225 may determine parameters required to execute the determined plurality of actions or result values output by the execution of the plurality of actions. The parameters and the result values may be defined as a concept of a designated format (or class). Accordingly, the plan may include a plurality of actions and a plurality of concepts determined by the user's intent. The planner module 225 may determine the relationship between the plurality of actions and the plurality of concepts in stages (or hierarchically). For example, the planner module 225 may determine the execution order of the plurality of actions determined based on the user's intent based on the plurality of concepts. In other words, the planner module 225 may determine the execution order of the plurality of actions based on parameters required for execution of the plurality of actions and results output by the execution of the plurality of actions. Accordingly, the planner module 225 may generate a plan including association information (e.g., ontology) between the plurality of actions and the plurality of concepts. The planner module 225 may generate a plan using information stored in the capsule database 230 in which a set of relationships between the concepts and the actions is stored.

The NLG module 227 according to an embodiment may change designated information into a text form. The information changed to the text form may be in the form of natural language utterance. The TTS module 229 according to an embodiment may change information in a text format into information in a voice format.

According to an embodiment, some or all of the functions of the first natural language platform 220 may be implemented in the user terminal 400.

The capsule database 230 may store information on relationship between a plurality of concepts and actions corresponding to a plurality of domains. A capsule according to an embodiment may include a plurality of action objects or action information and concept objects or concept information included in the plan. According to an embodiment, the capsule database 230 may store a plurality of capsules in the form of a concept action network (CAN). According to an embodiment, the plurality of capsules may be stored in a function registry included in the capsule database 230.

The capsule database (DB) 230 may include a strategy registry in which strategy information necessary for determining a plan corresponding to a voice input is stored. The strategy information may include reference information for determining one plan when there are a plurality of plans corresponding to the voice input. According to an embodiment, the capsule database 230 may include a follow-up registry in which information on a follow-up operation for suggesting a follow-up operation to the user in a designated situation is stored. The follow-up operation may include, for example, follow-up utterance. According to an embodiment, the capsule database 230 may include a layout registry that stores layout information of information output through the user terminal 400. According to an embodiment, the capsule database 230 may include a vocabulary registry in which vocabulary information included in the capsule information is stored. According to an embodiment, the capsule database 230 may include a dialog registry in which information about a dialog (or interaction) with a user is stored. The capsule database 230 may update a stored object through a developer tool. The developer tool may include, for example, a function editor for updating an action object or a concept object. The developer tool may include a vocabulary editor for updating the vocabulary. The developer tool may include a strategy editor for creating and registering a strategy for determining a plan. The developer tool may include a dialog editor for creating a dialog with a user. The developer tool may include a follow-up editor for editing follow-up utterance that activates a follow-up goal and provides a hint. The follow-up goal may be determined based on a currently configured goal, a user's preference, or an environmental condition. In an embodiment, the capsule database 230 may be implemented in the user terminal 400.

The execution engine 240 according to an embodiment may calculate a result using the generated plan. The end user interface 250 may transmit the calculated result to the user terminal 400. Accordingly, the user terminal 400 may receive the result and provide the received result to the user. The management platform 260 according to an embodiment may manage information used in the intelligent server 200. The big data platform 270 according to an embodiment may collect user data. The analysis platform 280 according to an embodiment may manage a quality of service (QoS) of the intelligent server 200. For example, the analysis platform 280 may manage the components and processing speed (or efficiency) of the intelligent server 200.

The service server 300 according to an embodiment may provide a designated service (e.g., food order or hotel reservation) to the user terminal 400. According to an embodiment, the service server 300 may be a server operated by a third party. The service server 300 according to an embodiment may provide information for generating a plan corresponding to the received voice input to the intelligent server 200. The provided information may be stored in the capsule database 230. In addition, the service server 300 may provide result information according to the plan to the intelligent server 200.

In the integrated intelligent system 10 described above, the user terminal 400 may provide various intelligent services to the user in response to a user input. The user input may include, for example, an input through a physical button, a touch input, or a voice input.

In an embodiment, the user terminal 400 may provide a voice recognition service through an intelligent app (or a voice recognition app) stored therein. In this case, for example, the user terminal 400 may recognize user utterance or a voice input received through the microphone, and may provide a service corresponding to the recognized voice input to the user.

In an embodiment, the user terminal 400 may perform a designated operation alone or together with the intelligent server and/or service server based on the received voice input. For example, the user terminal 400 may execute an app corresponding to the received voice input and may perform a designated operation through the executed app.

In an embodiment, when the user terminal 400 provides a service together with the intelligent server 200 and/or the service server, the user terminal may detect user's utterance using the microphone 420, and may generate a signal (or voice data) corresponding to the detected user's utterance. The user terminal may transmit the voice data to the intelligent server 200 using the communication circuit 410.

In a response to the voice input received from the user terminal 400, the intelligent server 200 according to an embodiment may generate a plan for performing a task corresponding to the voice input or a result obtained by performing an operation according to the plan. The plan may include, for example, a plurality of actions for performing a task corresponding to a user's voice input, and a plurality of concepts related to the plurality of actions. The concept may define parameters input to the execution of the plurality of actions or result values output by the execution of the plurality of actions. The plan may include association information between the plurality of actions and the plurality of concepts.

The user terminal 400 according to an embodiment may receive the response using the communication circuit 410. The user terminal 400 may output a voice signal generated inside the user terminal 400 using the speaker 430 to the outside, or an image generated inside the user terminal 400 using the display 440 to the outside.

Figure 3:
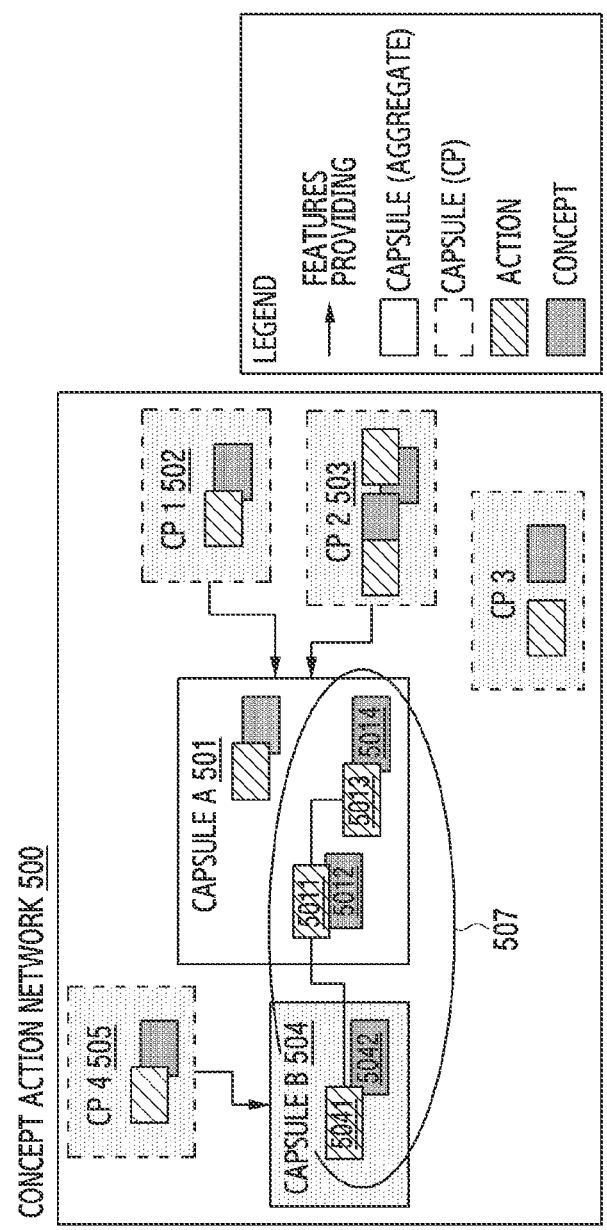
FIG. 3 is a diagram illustrating an example form in which relationship information between a concept and an action is stored in a database according to various embodiments.

FIG. 3 is a diagram illustrating an example form in which relationship information between a concept and an action is stored in a database according to various embodiments.

The capsule database (e.g., the capsule database 230) of the intelligent server 200 may store a capsule in the form of a concept action network (CAN). The capsule database may store an operation for processing a task corresponding to a user's voice input and a parameter necessary for the operation in the form of a CAN.

The capsule database may store a plurality of capsules (capsule A 501 and capsule B 504) corresponding to each of a plurality of domains (e.g., applications). According to an embodiment, one capsule (e.g., capsule A 501) may correspond to one domain (e.g., location (geo) or application). In addition, at least one service provider (or a content provider (e.g., CP 1 502 or CP 2 503)) for performing a function for a domain related to the capsule may correspond to one capsule. According to an embodiment, one capsule may include at least one action 510 and at least one concept 520 for performing a designated function.

The first natural language platform 220 may generate a plan for performing a task corresponding to the received voice input using the capsule stored in the capsule database. For example, the planner module 225 of the natural language platform may generate a plan using the capsule stored in the capsule database. For example, a plan 507 may be generated using actions 5011 and 5013 and concepts 5012 and 5014 of the capsule A 501, and an action 5041 and a concept 5042 of the capsule B 504.

Figure 4:
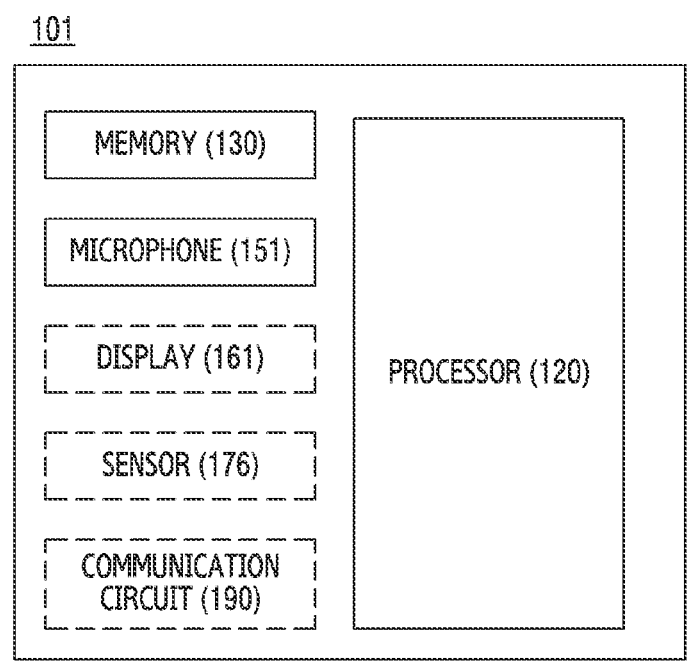
FIG. 4 is a block diagram illustrating an example electronic device according to various embodiments.

FIG. 4 is a block diagram illustrating an example configuration of an electronic device according to various embodiments.

Referring to FIG. 4, an electronic device 101 may include at least one processor (e.g., including processing circuitry) 120, a memory 130, a microphone 151, a display 161, a sensor 176, and a communication circuit 190. The communication circuit 190 and the communication module 190 may be used interchangeably. The components listed above may be operatively or electrically connected to each other. Some of the components of the electronic device 101 illustrated in FIG. 4 may be modified, deleted, or added as an example. The electronic device 101 according to various embodiments may include the user terminal 400 of FIG. 2. For example, the electronic device 101 may include all or some of the components of the electronic device 101 of FIG. 1. For example, the electronic device 101 may include all or some of the components of the user terminal 400 of FIG. 2. According to various embodiments, the electronic device 101 may communicate with the intelligent server of FIG. 2 and may perform actions according to various embodiments alone or together with the intelligent server. Hereinafter, the electronic device of FIG. 4 will be described in greater detail with reference to FIGS. 1, 2 and 3.

According to an embodiment, the microphone 151 (e.g., the microphone 420 of FIG. 2) may be included in the input device 150 described with reference to FIG. 1. In an embodiment, the microphone 151 may receive user's utterance and convert the received utterance into an electrical signal.

According to an embodiment, the memory 130 (e.g., the memory 450 of FIG. 2) may store a plurality of domain sets. The domain set may be a set of a plurality of domains required to perform a task based on a user's intent. The plurality of domain sets may include at least one of a business domain set, an office domain set, a home domain set, a morning domain set, an afternoon domain set, a night domain set, a vehicle domain set, a kids domain set, a weekend domain set, and a weekday domain set. The plurality of domain sets may include various other domain sets. In addition, a plurality of domain sets stored in the memory 130 may be downloaded by a user's selection. When a user downloads a desired domain set from the server, the memory 130 may store the domain set.

According to an embodiment, the sensor 176 may detect a state (e.g., location or use time) of the electronic device 101 and may generate an electrical signal or data value corresponding to the sensed state. According to an embodiment, the context information may include an electrical signal or data value corresponding to the state of the electronic device 101.

According to an embodiment, the processor 120 (e.g., the processor 460 of FIG. 2) may include various processing circuitry and execute an application based on data stored in the memory 130 and may perform various data processing or operations. According to an embodiment, as at least part of data processing or operations, the processor 120 may process a command or data received from another component (e.g., the sensor 176 or the microphone 151).

According to an embodiment, the processor 120 may acquire an electrical signal corresponding to the user's utterance received using the microphone 151. In addition, the processor 120 may obtain context information. According to an embodiment, the sensor 176 may be used to obtain context information of the processor 120. The context information may include various types of information related to the electronic device 101 or a user. For example, the context information may include at least one of a location of the electronic device 101, a user utterance time, a day, a date, and an occupation of the user of the electronic device 101.

According to an embodiment, the processor 120 may acquire user's utterance using the microphone 151 and may perform an operation corresponding thereto. The processor 120 may use data stored in the memory 130 when performing an operation corresponding to the user's utterance. For example, the processor 120 may determine one domain set from among a plurality of domain sets stored in the memory 130 in response to the user's utterance. According to an embodiment, the processor 120 may select one of a plurality of domain sets based on context information.

For example, the electronic device 101 may receive user utterance "Tell me about this week's schedule". When a user's utterance time is a weekday afternoon and the user of the electronic device 101 is an office worker, the context information may include the user's utterance time and user occupation information. The processor 120 may determine the weekday domain set based on the context information. The processor 120 may provide a deadline for a company business and a meeting schedule based on the user utterance and the weekday domain set. As another example, the electronic device 101 may receive the same user utterance "Tell me about this week's schedule". When the user's utterance time is a weekend morning and the user of the electronic device 101 is an office worker, the processor 120 may determine a weekend domain set based on the context information. The processor 120 may provide a weekend appointment schedule based on the user utterance and the weekend domain set.

According to an embodiment, the processor 120 may include a hardware structure specialized in processing a speech recognition model and/or domain set determination. A detailed embodiment is described in FIG. 6.

According to an embodiment, the display 161 (e.g., the display 440 of FIG. 2) may be included in the display device 160 described with reference to FIG. 1. The processor 120 may provide a result corresponding to the user's utterance using the display 161. For example, when the content of the user's utterance is "Tell me about this week's schedule", the processor 120 may determine a domain set based on the user's utterance and context information and may perform an operation corresponding to the user's utterance. According to an embodiment, the processor 120 may provide information related to the user's schedule using the display 161. That is, the display 161 may display information related to the user's schedule.

According to an embodiment, the display 161 may display various types of information. A specific embodiment will be described with reference to FIGS. 9 to 14.

According to an embodiment, the communication circuit 190 (e.g., the communication circuit 410 of FIG. 2) may communicate with the intelligent server 200 described with reference to FIG. 2. The electronic device 101 may transmit voice data and context information based on the user's utterance to the intelligent server 200 using the communication circuit 190. In addition, the electronic device 101 may receive a response from the intelligent server 200 using the communication circuit 190. The communication circuit 190 may communicate with the intelligent server 200 as well as various other servers (e.g., the service server 300 of FIG. 2).

The communication circuit 190 according to an embodiment may receive a plurality of domain sets from the intelligent server 200. A specific embodiment in which the communication circuit 190 receives a plurality of domain sets from the intelligent server 200 is described with reference to FIG. 5.

Figure 5:
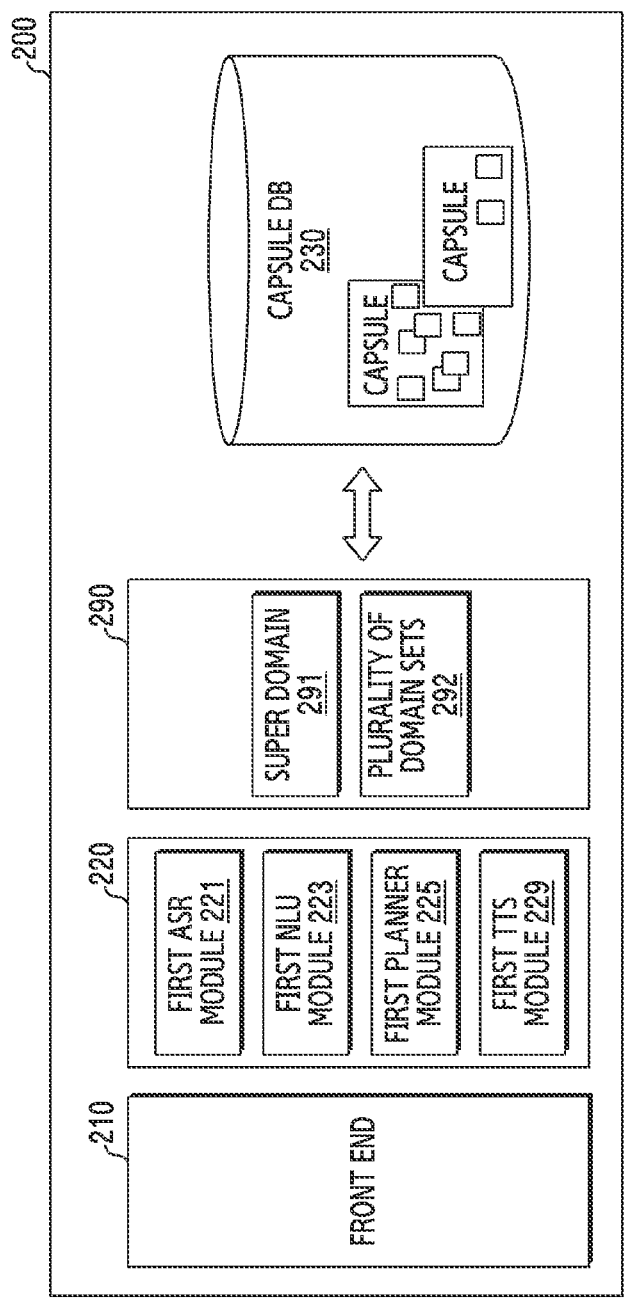
FIG. 5 is a block diagram illustrating an example configuration of an intelligent server including a natural language platform according to various embodiments.

FIG. 5 is a block diagram illustrating an example configuration of an intelligent server including a natural language platform according to various embodiments.

Referring to FIG. 5, the intelligent server 200 may include a front end 210, a first natural language platform 220, and a domain memory 290. According to an embodiment, the first natural language platform 220 of the intelligent server 200 may process the received user utterance. According to an embodiment, the intelligent server 200 may process a voice input received from the user terminal 400. The intelligent server 200 may be illustrated by omitting some of the components of the intelligent server 200 of FIG. 2. In other words, the intelligent server 200 may further include the remaining components of the intelligent server 200 of FIG. 2.

According to an embodiment, the intelligent server 200 may include a communication interface (e.g., including communication circuitry), a memory, and a processor (e.g., including processing circuitry). The processor may include various processing circuitry and perform control to transmit/receive data (or information) to and from an external electronic device (e.g., the electronic device 101 of FIG. 1) through a communication interface. The processor may execute instructions stored in the memory to perform operations of the front end 210, the first natural language platform 220, and the domain memory 290.

According to an embodiment, the front end 210 may be connected to the electronic device 101 to receive user-related information. For example, the user-related information may include at least one of a user's voice input, information on the electronic device 101, and user preference information.

According to an embodiment, the first natural language platform 220 may process user's utterance. The first natural language platform 220 may process various voice inputs without being limited to a specific voice input. According to an embodiment, the first natural language platform 220 may include a first automatic speech recognition module (ASR module) 221, a first natural language understanding module (NLU module) 223, a first planner module 225, and a first text-to-speech module (TTS module) 229, each of which may include various processing circuitry and/or executable program instructions.

According to an embodiment, the first ASR module 221 may generate text data corresponding to the received user utterance. The first ASR module 221 may generate text data using an acoustic model and a language model. The acoustic model may include information related to vocalization, and the language model may include information on a combination of unit phoneme information and unit phoneme information. For example, the first ASR module 221 may convert the user's utterance into text data using the information related to vocalization and information about unit phoneme information.

According to an embodiment, with respect to the text data generated by the first ASR module 221, the first NLU module 223 may identify an intent of the user input or a matching domain using the natural language processing model. According to an embodiment, the first NLU module 223 may acquire components (e.g., slots or task parameters) necessary for expressing user intent. For example, the first NLU module 223 may perform syntactic analysis and semantic analysis on speech data. Based on the analysis result, a domain or intent corresponding to the corresponding utterance may be determined, and components necessary for expressing the user intent may be obtained.

According to an embodiment, the first planner module 225 may generate a plan corresponding to the received user utterance. The plan may be determined based on the determined intent, parameters, and the context information described with reference to FIG. 4. According to an embodiment, the intelligent server 200 may calculate a result using the generated plan and may transmit the calculated result to the electronic device 101. According to an embodiment, the intelligent server 200 may directly transmit the generated plan to the electronic device 101. The electronic device 101 may sequentially perform designated operations according to the plan.

According to an embodiment, the first TTS module 229 may generate a voice signal for interaction with the user. According to an embodiment, the first TTS module 229 may convert text data into a voice signal. According to an embodiment, the electronic device 101 may receive the voice signal from the intelligent server 200 and may output guide information.

According to an embodiment, the domain memory 290 may store a super domain 291 and a plurality of domain sets 292. The super domain 291 may include a plurality of domains described with reference to FIG. 2. Each of the plurality of domains may include a plurality of actions. According to an embodiment, the processor may generate the super domain 291 using the capsule stored in the capsule database 230 described with reference to FIG. 2. According to an embodiment, the processor may classify the super domain 291 to generate the plurality of domain sets 292. The plurality of domain sets 292 may include all of the plurality of domain sets included in the electronic device 101. According to an embodiment, the criterion for classifying the plurality of domain sets 292 may be at least one of information about the user's electronic device 101 and user preference information. For example, the plurality of domains included in the super domain 291 may be classified based on time, region, location, and usage, such as a vehicle domain set, a business domain set, a weekend domain set, a country domain set, or a portal domain set. For example, the vehicle domain set may include domains corresponding to voice services used in automobiles. According to an embodiment, each of the plurality of domain sets 292 may include a capsule. The processor may generate domain sets according to various criteria in addition to the described domain sets.

According to an embodiment, the communication circuit 190 may receive some of the plurality of domain sets 292 from the intelligent server 200. According to an embodiment, the processor 120 may receive a domain set based on user utterance and context information among the plurality of domain sets 292 using the communication circuit 190. The domain set received from the intelligent server 200 may be different from the domain set stored in the memory 130.

According to an embodiment, when a user downloads or executes a designated application, it may be necessary to download a voice service related to the designated application. The processor 120 may receive data required for the voice service of the designated application among data included in the intelligent server 200 using the communication circuit 190. In an embodiment, the processor 120 may request from the user whether to download the voice service associated with the designated application. According to an embodiment, the user may be provided with the voice service of the designated application if necessary. A detailed embodiment will be described with reference to FIGS. 12 to 13.

According to an embodiment, the processor 120 may acquire additional context information different from the context information. In an embodiment, the additional context information may be associated with at least one of the electronic device 101 or the user. The processor 120 may receive at least one domain set among the plurality of domain sets 292 using the communication circuit 190 from the intelligent server 200 based on the additional context information and the user's utterance. That is, not only the domain set stored in the electronic device 101 but also the plurality of domain sets 292 stored in the intelligent server 200 may be used. The processor 120 may perform an operation corresponding to the user's utterance based on the domain set received from the intelligent server 200.

Figure 6:
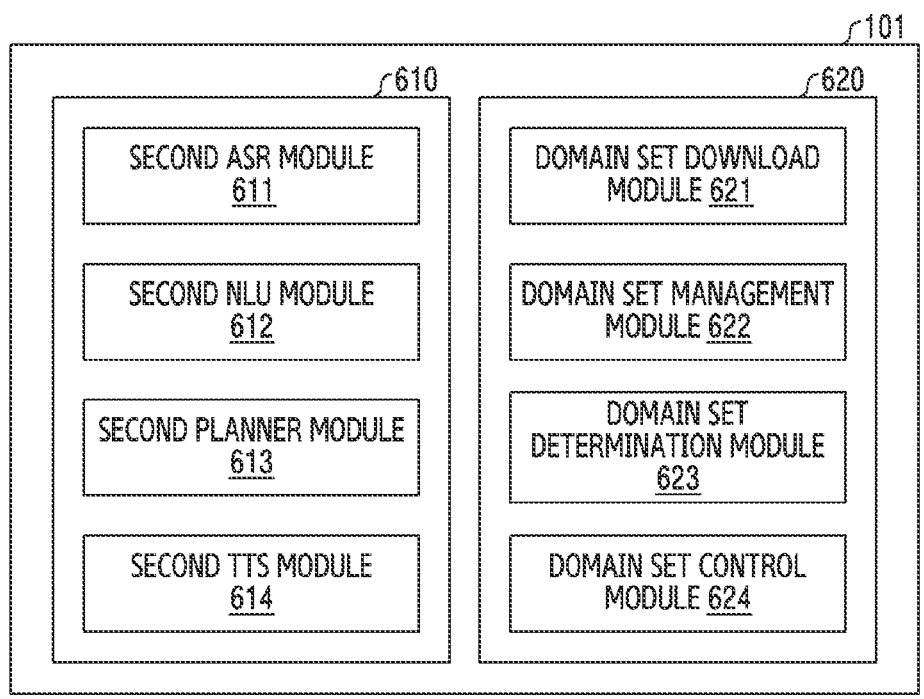
FIG. 6 is a block diagram illustrating an example electronic device including a natural language platform and an on-device domain set platform according to various embodiments.

FIG. 6 is a block diagram illustrating an example configuration of an electronic device including a natural language platform and an on-device domain set platform according to various embodiments.

According to an embodiment, the electronic device 101 may include a second natural language platform 610 and an on-device domain set platform 620. The second natural language platform 610 may correspond to an on-device natural language understanding platform. According to an embodiment, the processor 120 may implement the second natural language platform 610 or the on-device domain set platform 620 based on a program stored in the memory 130.

According to an embodiment, the second natural language platform 610 (on-device natural language understanding module) may include a second ASR module 611, a second NLU module 612, a second planner module 613, and a second TTS module 614, each of which may include various processing circuitry and/or executable program instructions. The second natural language platform 610 may process received user utterance complementary to the first natural language platform 220. According to an embodiment, the second natural language platform 610 of the electronic device 101 may process some voice inputs that can be processed by the first natural language platform 220. In other words, the second natural language platform 610 may process a limited voice input compared to the first natural language platform 220.

According to an embodiment, the intelligent server 200 described with reference to FIG. 2 may change the voice input processed by the second natural language platform 610 of the electronic device 101. According to an embodiment, the processor of the intelligent server 200 may determine whether to change (or update) a natural language understanding model used in the second natural language understanding module 673 of the electronic device 101.

According to an embodiment, the second ASR module 611, the second NLU module 612, the second planner module 613, and the second TTS module 614 may be embedded modules for performing designated functions. According to an embodiment, the electronic device 101 may receive a voice input. According to an embodiment, the electronic device 101 may process a voice input received through the second ASR module 611, the second NLU module 612, and the second planner module 613. According to an embodiment, the second ASR module 611, the second NLU module 612, and the second planner module 613 of the electronic device 101 may process the voice input similarly to the ASR module 221, the first NLU module 223, and the first planner module 225 of the intelligent server 200. According to an embodiment, the second NLU module 612 may determine the intent of the received voice input. The second NLU module 612 may determine an intent corresponding to the voice input using the natural language understanding model. According to an embodiment, the electronic device 101 may process only the voice input corresponding to a limited number of intents through the second automatic speech recognition module 611, the second natural language understanding module 612, and the second planner module 613. The intent recognizable by the electronic device 101 may be a part of the intent recognizable by the intelligent server 200.

According to an embodiment, the electronic device 101 may generate a voice signal for interaction with the user through the second TTS module 614. The second TTS module 614 of the electronic device 101 may generate a voice signal similarly to the first TTS module 229 of the intelligent server 200.

According to an embodiment, the on-device domain set platform 620 may include a domain set download module 621, a domain set management module 622, a domain set determination module 623, and a domain set control module 624. According to an embodiment, the on-device domain set platform 620 may include various modules for managing a plurality of domain sets of the electronic device 101, each of which may include various processing circuitry and/or executable program elements.

According to an embodiment, the domain set download module 621 may serve to download some of the plurality of domain sets 292 from a server (e.g., the intelligent server 200 of FIG. 5). The domain set download module 621 may store the downloaded domain set, and the capsule and the database described with reference to FIG. 3 in a specific location. According to an embodiment, the electronic device 101 may provide a service using the domain set, the capsule, and the database stored in the specific location. In addition, when the user downloads or executes a designated application, the domain set download module 621 may also download a voice service for the application. For example, when a user downloads or executes a designated application, the user may select whether to download a voice service related to the corresponding application. When the user selects to download the related voice service, the electronic device 101 may receive data required for the voice service of the designated application from the server using the domain set download module 621. By allowing the domain set download module 621 to receive data as needed, the space of the storage device can be efficiently used by reducing the weight of unnecessary resources and unused commands.

According to an embodiment, the domain set management module 622 may manage a plurality of domain sets received from the intelligent server 200. According to an embodiment, the domain set management module 622 may classify a plurality of domain sets (e.g., time, space, etc.). According to an embodiment, the domain set management module 622 may configure a domain set that meets a classification condition. Alternatively, the user may directly match the plurality of domain sets with a required time and space to configure the domain set that meets the classification condition. For example, the business domain set may be configured during weekdays and during the daytime.

According to an embodiment, when the classification condition is changed, the domain set management module 622 may determine a domain set corresponding to the changed condition in the background. For example, when the user's speech location of the electronic device 101 is changed from home to a vehicle, the domain set management module 622 may change the domain set selected to correspond to the user's utterance from the home domain set to the vehicle domain set. According to an embodiment, when the domain set is determined, the electronic device 101 may provide a voice service corresponding to the user's utterance based on the capsule and the database in the domain set. As the voice service is provided based on the domain sets classified according to the classification condition, a problem caused by a utterance collision can be solved and the accuracy of the voice service can be improved.

According to an embodiment, the domain set determination module 623 may determine a domain set to be used for providing the voice service corresponding to the user's utterance. For example, the domain set determination module 623 may determine the domain set using the context information described with reference to FIG. 5 based on the user's configuration or the classification condition. According to an embodiment, when there are a plurality of domain sets classified by the domain set management module 623, the domain set determination module 623 may determine the domain set based on the user's utterance as well as the context information. According to an embodiment, the domain set determination module 623 may determine the domain set according to a priority in advance with respect to the domain set in which a conflict on the user utterance or function occurs.

According to an embodiment, the domain set determination module 623 may determine a domain set for providing a voice service corresponding to the user's utterance, and the processor 120 may provide a voice service.

According to an embodiment, the processor 120 may provide different voice services based on the context information even for the same user utterance. According to an embodiment, each of the plurality of domain sets may include a plurality of subsets related to an operation. The processor 120 may determine a subset within the domain set determined based on the context information. For example, the domain set determination module 623 may determine a map domain set in response to user utterance ("find a way home"). The processor 120 may select a subset for outputting a walking route in the map domain set based on context information indicating that the user is walking. In another embodiment, the processor 120 may select a subset for outputting a car route despite the same user utterance (e.g., "find a way home") based on the context information indicating that the vehicle is being boarded.

The electronic device 101 may request user's satisfaction with the corresponding voice service. The user may evaluate whether the voice service was adequate. According to an embodiment, the domain set determination module 623 may determine the domain set according to the user's satisfaction. For example, when determining the domain set, the domain set determination module 623 may determine the domain set using the context information and the user utterance as well as a user's satisfaction history.

According to an embodiment, the domain set control module 624 may read information on the domain set determined by the domain set determination module 623 and may turn off a label for a service not used by the user, thereby limiting an utterance collision. According to an embodiment, the domain set control module 624 may determine a service which is not used by the user based on various types of information (e.g., panic disorder severity scale (PDSS), Gio data base (GioDB), time database (TimeDB), etc.).

According to an embodiment, the domain set control module 624 may modify the capsule according to a user's request. According to an embodiment, the domain set control module 624 may delete or add some of the plurality of capsules included in each domain set according to the user's request. For example, a vehicle driving domain set may include a capsule related to music connection. The user can prevent and/or reduce the utterance collision and efficiently manage the memory by deleting a capsule corresponding to a music connection-related service that is not used in the vehicle driving domain set.

According to an embodiment, each of the plurality of domain sets may include a plurality of subsets. The plurality of subsets may be divided according to the content of the operation. For example, subsets such as a car route, a walking route, and a public transportation route may be included in one map domain set. In an embodiment, the plurality of subsets may correspond to a capsule. According to an embodiment, the domain set control module 624 may manage the plurality of subsets included in each of the plurality of domain sets through a user's request or a background task. For example, based on the user's request or the background task, some of the plurality of subsets may be deleted or a new subset may be added to the domain set.

Figure 7:
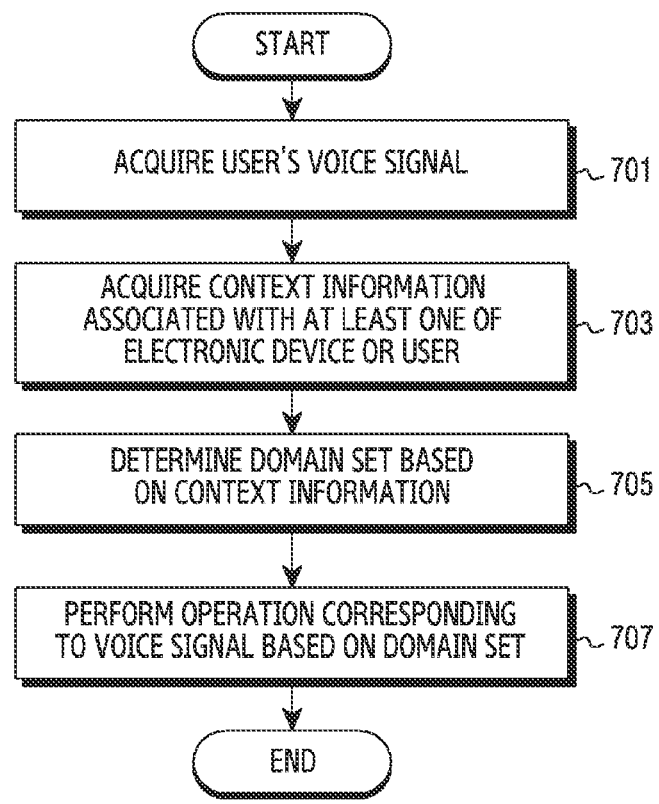
FIG. 7 is a flowchart illustrating an example operation of an electronic device according to various embodiments.

FIG. 7 is a flowchart illustrating an example operation of an electronic device according to various embodiments.

Referring to FIG. 7, in operation 701, at least one processor 120 of the electronic device 101 may acquire a user's voice signal input to the electronic device. For example, the processor may process a voice signal input using the microphone 151 of the electronic device and may convert the voice signal into text using the second natural language platform 610.

According to an embodiment, in operation 703, the processor 120 may acquire (generate) context information associated with at least one of the electronic device 101 and the user. For example, when a user's utterance time is in the afternoon on a weekday, the electronic device 101 is located in the user's company, and the user's job is an office worker, such information may be included in context information. That is, the context information may include various types of information such as a location of the electronic device 101, an utterance time, a day, a date, and a user's occupation.

According to an embodiment, in operation 705, the processor 120 may determine a domain set based on the context information. According to an embodiment, the processor may determine one domain set from among a plurality of domain sets stored in the memory 130 of the electronic device. For example, when the user makes utterance in a car on the weekend, the processor may determine one of a weekend domain set and a vehicle domain set to provide a voice service corresponding to the user's utterance. According to an embodiment, the domain set may be determined by the domain set determination module 623. The determined domain set may include a capsule, a database, and the like for performing an operation corresponding to the user's utterance.

According to an embodiment, in operation 707, the processor 120 may provide a voice service corresponding to the user's utterance based on the domain set determined. That is, the processor 120 may perform an operation corresponding to the acquired voice signal. According to an embodiment, the processor 120 may perform an operation corresponding to the user's utterance (voice signal) among various operations included in the domain set determined based on the context information. For example, when a vehicle domain set is selected and a voice signal of "Tell me the nearest E-MART from the current location" is obtained, the location of E-MART that is the shortest distance from the current location of the electronic device or the way to the E-MART may be guided.

Figure 8:
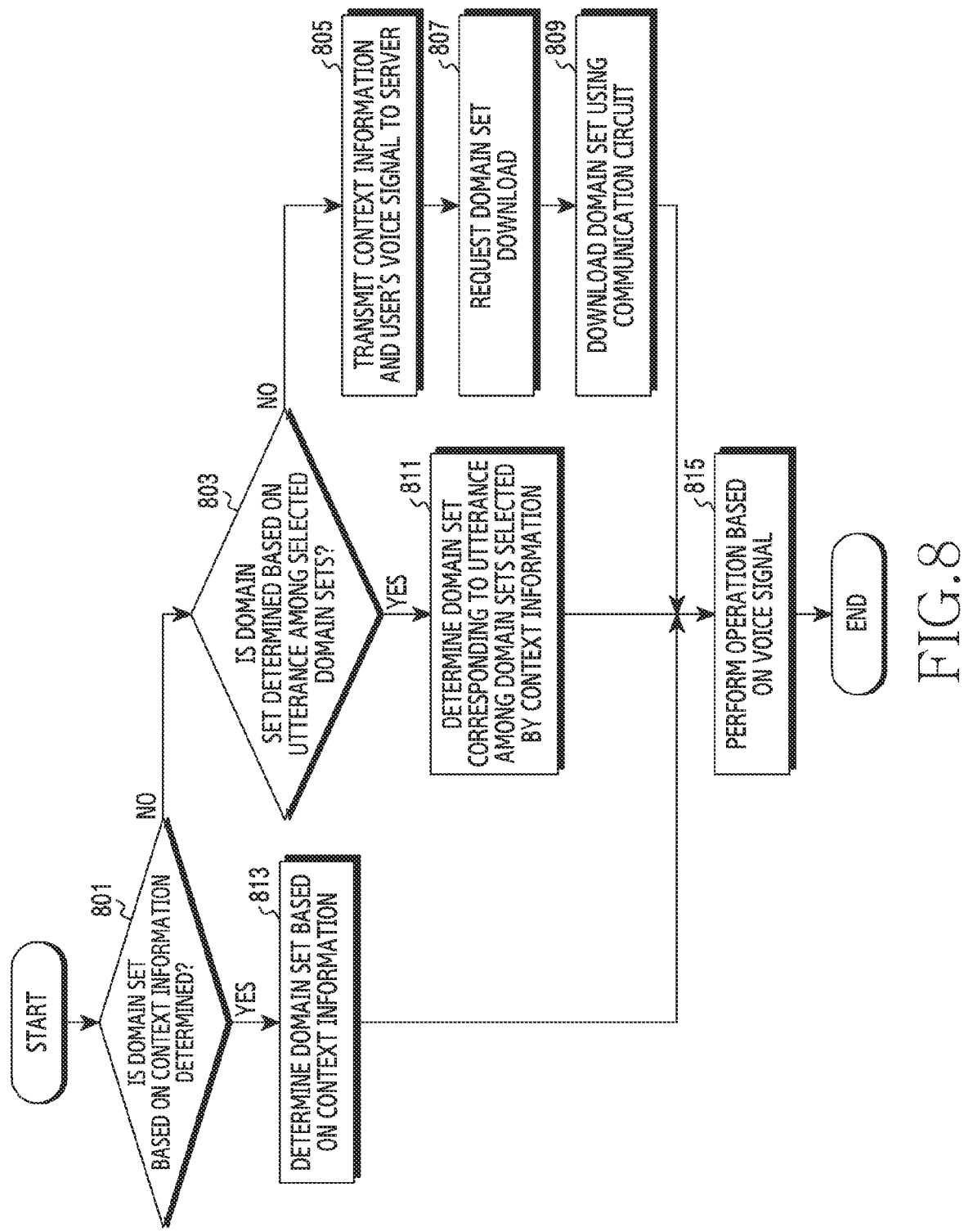
FIG. 8 is a flowchart illustrating an example operation of an electronic device and an intelligent server according to various embodiments.

FIG. 8 is a flowchart illustrating an example operation of an electronic device and an intelligent server according to various embodiments.

Referring to FIG. 8, in operation 801, the at least one processor 120 of the electronic device 101 may determine whether one domain set among a plurality of domain sets stored in the memory 130 can be determined based on context information. When one domain set can be determined, the at least one processor 120 may determine the one domain set based on the context information in operation 813. In operation 815, a corresponding operation may be performed based on user's utterance (voice signal) among a plurality of operations included in the domain set.

According to an embodiment, when the processor 120 cannot determine one domain set based on the context information, in operation 803, the processor 120 may determine whether there are two or more domain sets based on the context information. That is, in operation 803, the processor 120 may determine whether the domain set can be determined based on the user's utterance among the selected domain sets. According to an embodiment, the processor 120 may select two or more domain sets from among the plurality of domain sets stored in the memory 130 based on the context information, and may determine one domain set based on the user's utterance among the two or more domain sets. In operation 811, one domain set corresponding to the user's utterance may be determined among the domain sets selected based on the context information. According to an embodiment, the processor 120 may perform a corresponding operation based on the user's utterance (voice signal) among the plurality of operations included in the determined domain set, similarly to operation 815 described above.

According to an embodiment, the processor 120 may determine that the domain set based on the context information and the user's utterance is not stored in the memory 130. According to an embodiment, in operation 805, the processor may transmit the context information and the user's voice signal (user utterance) to the intelligent server 200 using the communication circuit 190. The intelligent server may analyze the user's voice signal using the first natural language platform 220. According to an embodiment, the intelligent server may include the plurality of domain sets 292. In operation 807, the processor may request from intelligent server 200 to download the domain set corresponding to the context information and the user's voice signal (user utterance) among the plurality of domain sets. In operation 809, the electronic device may receive the download-requested domain set using the communication circuit 190. In the same or similar manner as in operation 815 described above, the processor 120 may perform a corresponding operation based on the user's utterance (voice signal) among the plurality of operations included in the downloaded domain set. The memory 130 may store the domain set downloaded using the communication circuit 190.

According to an embodiment, the electronic device may omit operations 801 and 803. According to an embodiment, the processor 120 may process a voice signal input using the microphone 151 of the electronic device and may convert the voice signal into text using the second natural language platform 610. The processor 120 may obtain (generate) context information associated with at least one of the electronic device 101 or the user. According to an embodiment, the processor may use the sensor 176 to acquire the context information. The context information may include various types of information related to the electronic device or the user. The processor 120 may transmit the context information and the user voice signal acquired in operation 805 to the intelligent server 200, and the electronic device may perform operations 807 to 815 described above.

Figure 9:
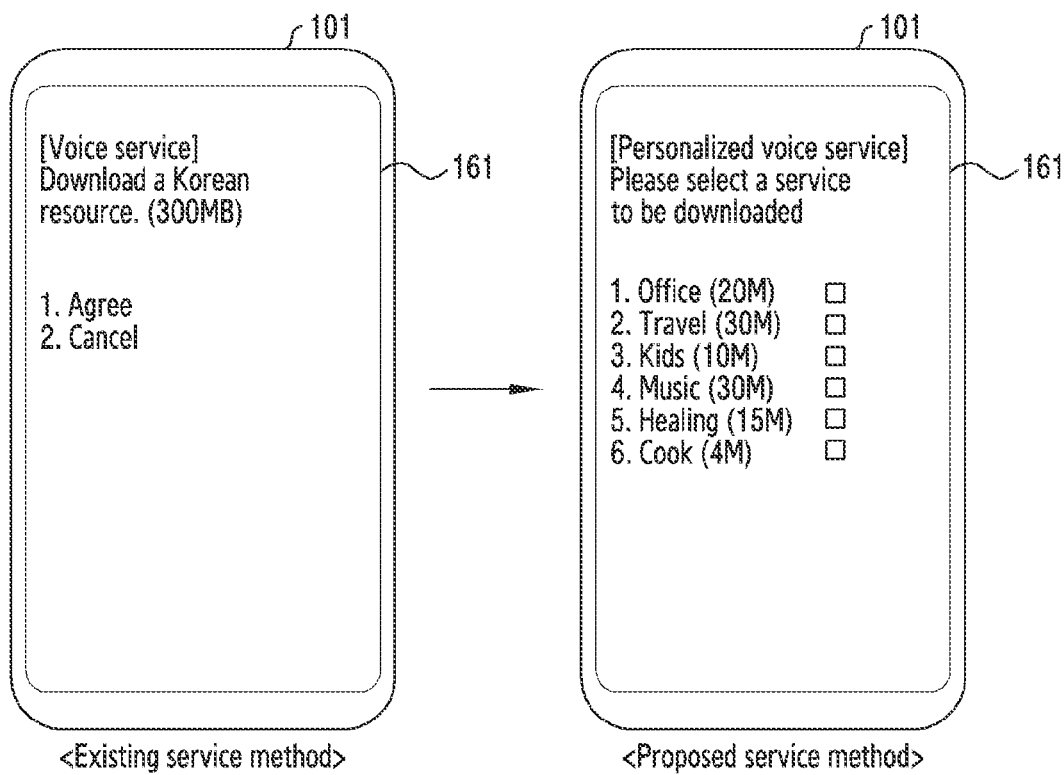
FIG. 9 is a diagram illustrating an existing service method and an example service method according to various embodiments.

FIG. 9 is a diagram illustrating an existing service method and an example service method according to various embodiments.

Referring to FIG. 9, at least one processor 120 of the electronic device 101 may display an output of domain download guidance for providing a voice service through the display 161.

According to an embodiment, the processor 120 may display a guidance on whether to download a resource required for providing a voice service. For example, the processor 120 of the electronic device 101 in the existing service method may display "download a Korean resource" on the display 161. Accordingly, the user may select "1. Agree" or "2. Cancel". The electronic device 101 may download a Korean resource required to provide a voice service when the user selects "1. Agree", and may not download the Korean resource required to provide the voice service when the user selects "2. Cancel". In the existing service method, since all domains described with reference to FIG. 2 are downloaded, a possibility of utterance collision increases, so the accuracy of the voice service may decrease, and there may be a shortage of memory capacity.

According to an embodiment, the processor 120 may display a guidance so that the user can select and download a necessary voice service. The service may be a domain set described with reference to FIG. 4, and the service may be hereinafter expressed as a domain set. According to an embodiment, in the proposed service method, the processor 120 of the electronic device 101 may display "Please select a service to be downloaded" on the display 161. The domain set to be downloaded may include "1. Office, 2. Travel, 3. Kids, 4. Music, 5. Healing, 6. Cook". According to various embodiments of the disclosure, the voice service to be downloaded may further include various types of domain sets. According to an embodiment, the user may select at least one domain set from among the domain sets to be downloaded displayed on the display 161 in the proposed service method. The electronic device 101 may receive the domain set selected by the user from among the plurality of domain sets 292 included in the intelligent server 200 using the communication circuit 190. The memory 130 may store the received domain set.

Figure 10:
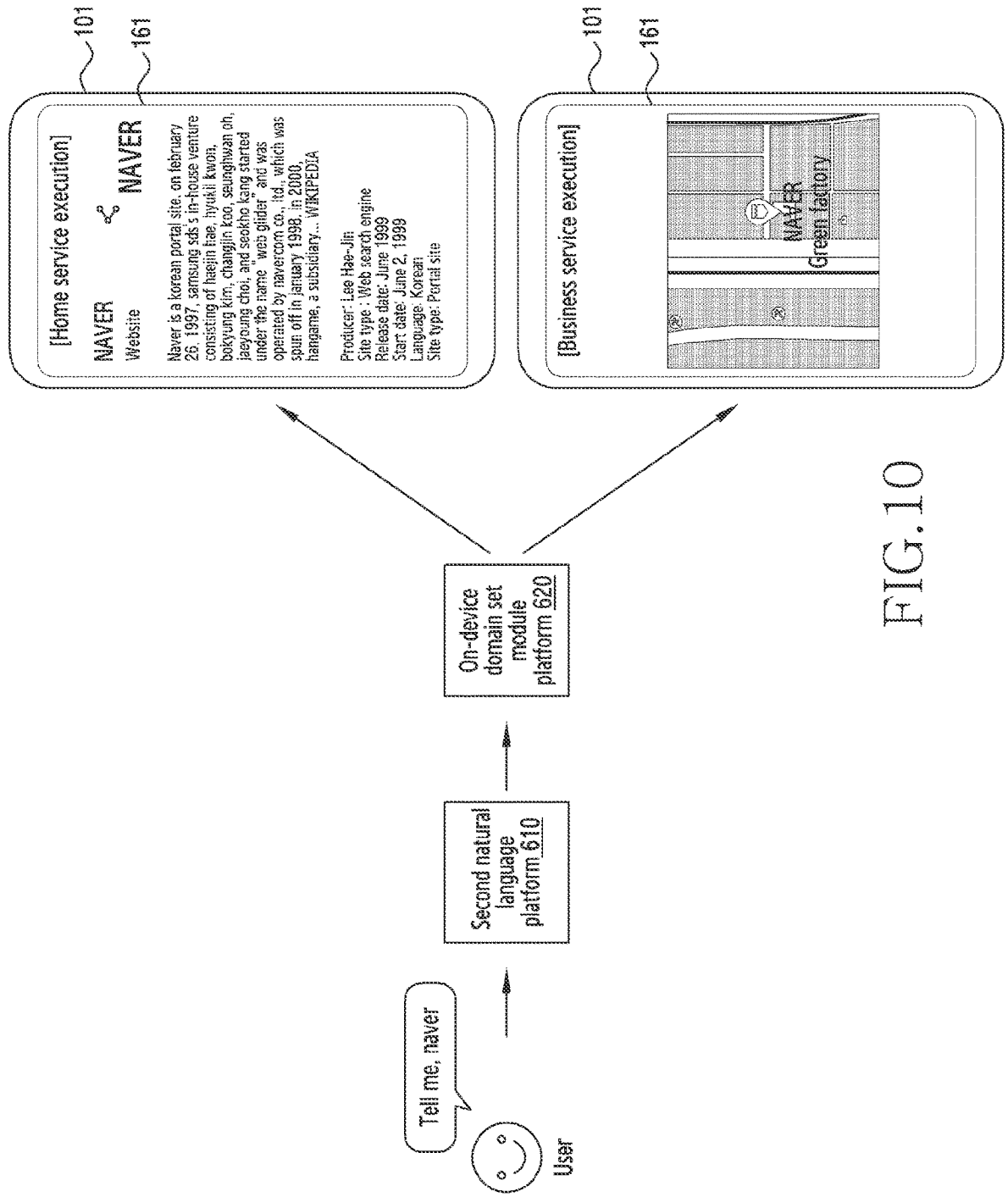
FIG. 10 is a diagram illustrating example content that an electronic device provides a service in response to a user's utterance according to various embodiments.

FIG. 10 is a diagram illustrating example content that an electronic device provides a service in response to a user's utterance according to various embodiments.

Referring to FIG. 10, the electronic device 101 may acquire user utterance of "Tell me, Naver" using the microphone 151. The electronic device 101 may process the acquired user utterance using the second natural language platform 610.

According to an embodiment, the electronic device 101 may determine a domain set for providing a voice service in response to the user's utterance using the on-device domain set module platform 620. The on-device domain set module platform 620 may determine the domain set based on the user's utterance and context information processed through the second natural language platform 610.

According to an embodiment, the domain set downloaded by the user of the electronic device 101 may be a home domain set or a business domain set. The memory 130 of the electronic device 101 may store the home domain set or the business domain set. The electronic device 101 may download the home domain set or the business domain set from the intelligent server 200 using the communication circuit 190.

According to an embodiment, when the user downloads the home domain set, the processor or the on-device domain set module platform 620 may select the home domain among the plurality of domain sets stored in the memory in response to the user utterance of "Tell me, Naver". The processor 120 may output a search result of "Naver" based on the user's utterance among operations included in the home domain set. That is, the display 161 may output a result of searching for "Naver" on a portal site.

According to an embodiment, when the user downloads the business domain set, the processor 120 or the on-device domain set module platform 620 may select the business domain set among the plurality of domain sets stored in the memory in response to the user's utterance of "Tell me, Naver". The processor 120 may indicate the location of "Naver" based on the user's utterance among the operations included in the business domain set. That is, the display 161 may output the location of "Naver" on the map.

According to an embodiment, the user may download both the home domain set and the business domain set. In this case, the processor of the electronic device 101 or the on-device domain set module platform 620 may provide a service based on the user's utterance "Tell me, Naver" and the context information.

Figure 11:
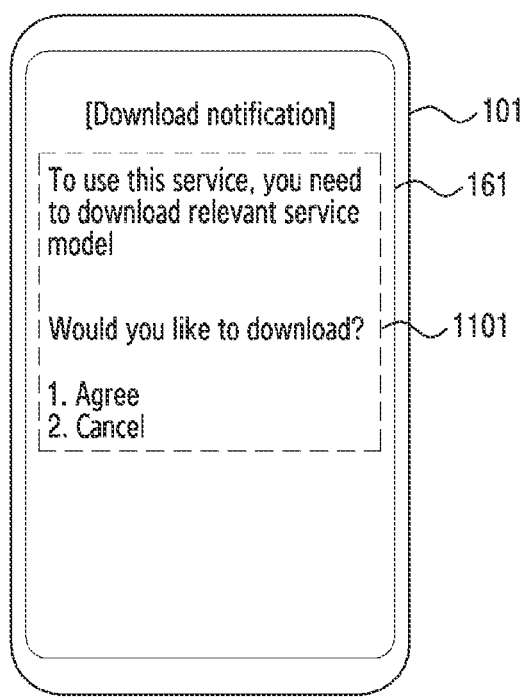
FIG. 11 is a diagram illustrating an example UI displayed on a display in an electronic device according to various embodiments.

FIG. 11 is a diagram illustrating an example UI displayed on a display in an electronic device according to various embodiments.

Referring to FIG. 11, the electronic device 101 may display a "download notification" through the display 161. The "download notification" displayed on the display 161 may be output through the display device 160. According to an embodiment, when the domain set described with reference to FIG. 4 corresponding to the user's utterance is not in the memory 130 of the electronic device 101, the "download notification" indicates that the display 161 requires the domain set. For example, the display 161 may display a related-service model download request 1101 for use of the corresponding service. When the user "agrees" to the download request, the electronic device 101 may download the corresponding domain set from the intelligent server 200.

Figure 12:
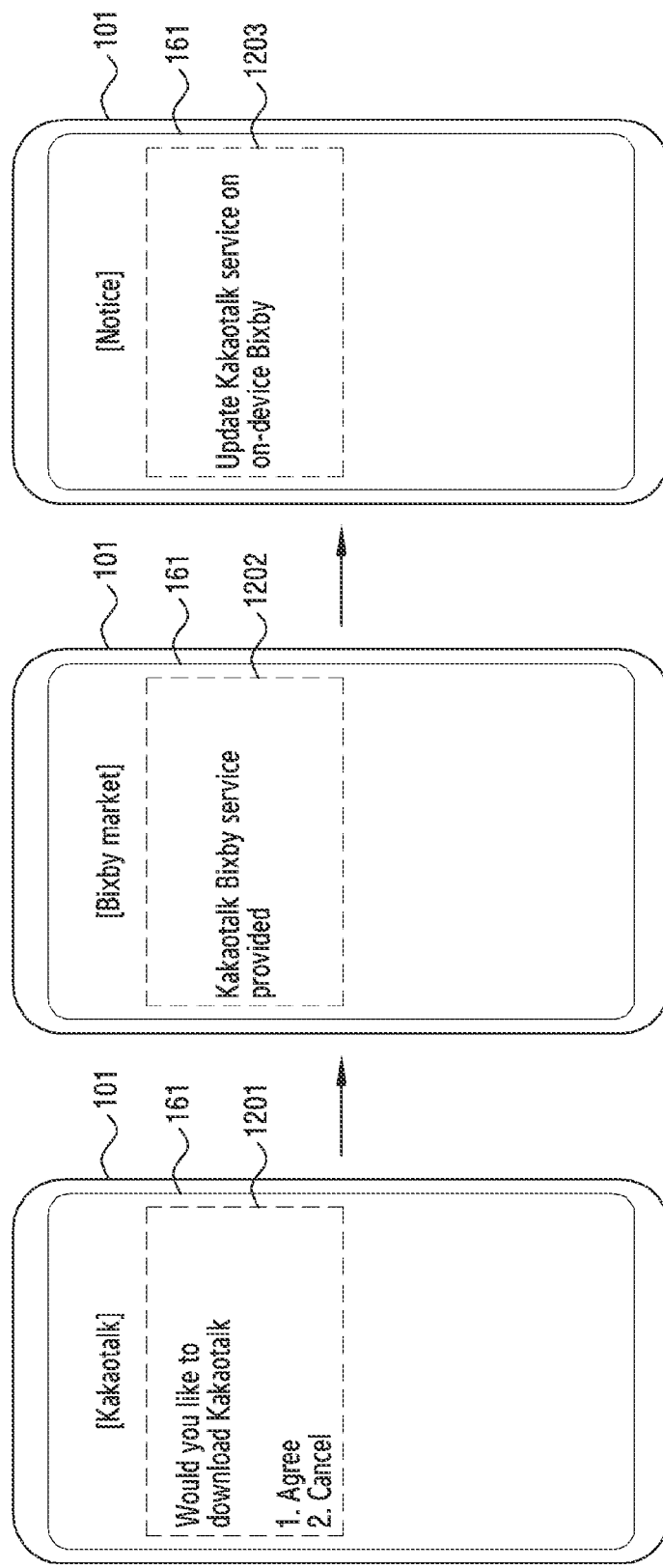
FIG. 12 is a diagram illustrating an example UI displayed on a display in an electronic device according to various embodiments.

FIG. 12 is a diagram illustrating an example UI displayed on a display in an electronic device according to various embodiments.

Referring to FIG. 12, when the electronic device 101 downloads an application, the electronic device 101 may automatically provide a voice service. According to an embodiment, the display 161 may output a download guidance 1201 for a voice service (domain) corresponding to a designated application. For example, when the user downloads "KakaoTalk", the electronic device 101 may receive data necessary for providing a voice service of "KakaoTalk" from the intelligent server 200 using the communication circuit 190. The display 161 may display a data download guide 1202 related to the voice service of "KakaoTalk". According to an embodiment, when "KakaoTalk" is updated, the electronic device 101 may receive updated data related to "KakaoTalk" from the intelligent server 200 using the communication circuit 190. The display 161 may display an update guidance 1203 related to "KakaoTalk". According to an embodiment, the content displayed through the display 161 may be output through the display device 160. Since the electronic device 101 downloads all domains corresponding to the application, the possibility of an utterance collision may increase and the storage space of the memory may become insufficient.

Figure 13:
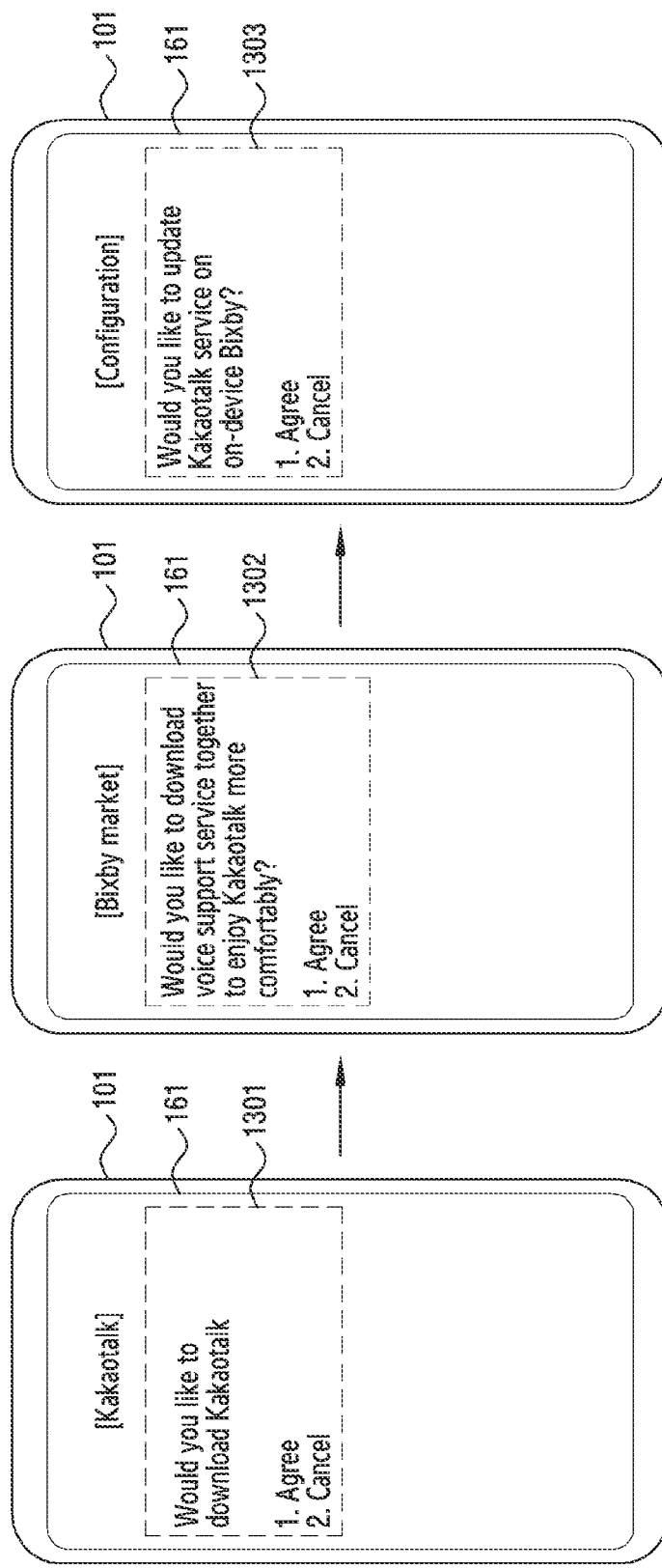
FIG. 13 is a diagram illustrating an example UI displayed on a display in an electronic device according to various embodiments.

FIG. 13 is a diagram illustrating an example UI displayed on a display in an electronic device according to various embodiments.

Referring to FIG. 13, when the electronic device 101 downloads a designated application or executes an application, the electronic device 101 may provide a voice service according to a user's selection. According to an embodiment, the display 161 may output a guidance on whether to download a voice service related to the designated application 1301. For example, when the user downloads or executes the application "KakaoTalk", the display 161 may display a guidance 1302 whether to download a voice support service related to "KakaoTalk". The guidance 1302 on whether to download may include whether to "agree" to the download. When the user "agrees", the electronic device 101 may receive data necessary for providing the voice service of "KakaoTalk" from the intelligent server 200 using the communication circuit 190. When the user does not agree, the electronic device 101 may not provide the voice service related to "KakaoTalk".

According to an embodiment, when the designated application is updated, the data necessary for providing the voice service may be changed. The display 161 may output a guidance to the user whether to update the voice service of the designated application. For example, when "KakaoTalk" is updated, the display 161 may display a guidance 1303 whether to update a "KakaoTalk" voice support service. The guidance 1303 on whether to update may include whether to "agree" to the update. When the user "agrees" to the update, the electronic device 101 may execute an update for the voice support service of "KakaoTalk" using the communication circuit 190. When the user does not agree, the electronic device 101 may provide an existing voice support service without performing an update for the voice support service of "KakaoTalk". According to an embodiment, content displayed through the display 161 may be output through the display device 160. According to an embodiment, the electronic device 101 may automatically update the voice support service according to a user's request. By downloading the domain corresponding to the application according to the user's request, the electronic device 101 may reduce the possibility of an utterance collision and increase the utilization of the storage space of the memory.

Figure 14:
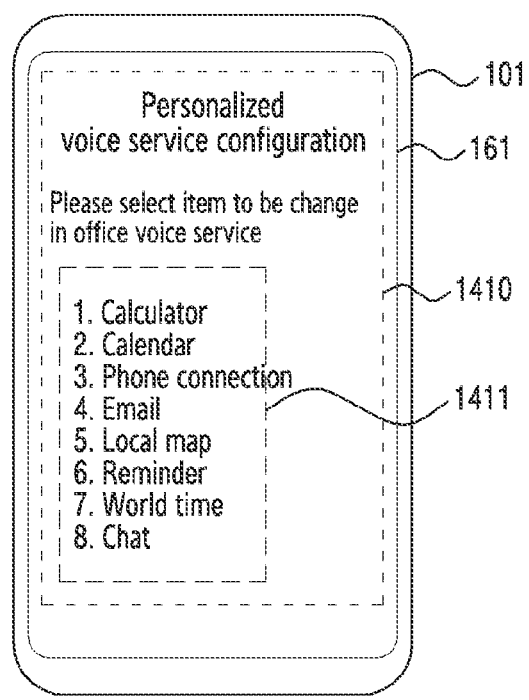
FIG. 14 is a diagram illustrating example contents of modifying a domain set according to various embodiments.

FIG. 14 is a diagram illustrating example contents of modifying a domain set according to various embodiments.

Referring to FIG. 14, the electronic device 101 may display a domain set modification guidance through the display 161. According to an embodiment, the user may select a domain set to be modified from among a plurality of domain sets stored in the memory 130 of the electronic device 101. According to an embodiment, the electronic device 101 may determine the domain set to be modified based on a user's request, may delete a capsule (e.g., the capsule of FIG. 3) included in the domain set to be modified, or may add a new capsule to the domain set to be modified.

For example, the user may modify an office domain set. The display 161 may display a guidance 1410 for modifying the office domain set. The office domain set may include various capsules 1411. The display 161 may display various changeable capsules 1411. According to an embodiment, content displayed through the display 161 may be output through the display device 160. According to an embodiment, the user may select a capsule to be deleted from among various capsules 1411 included in the office domain set. In response, the processor 120 or the domain set control module 624 included in the electronic device 101 may modify the office domain set stored in the memory. The disclosure is not limited to the contents described with reference to FIG. 14, and the domain set may be modified in various ways.

As described above, according to an example embodiment, an electronic device (e.g., the electronic device 101 of FIG. 1) may include: a microphone (e.g., the microphone 151 of FIG. 4); a memory (e.g., the memory 130 of FIG. 4) storing a plurality of domain sets; and at least one processor (e.g., the processor 120 of FIG. 4) electrically connected to the microphone and the memory, wherein the at least one processor is configured to: acquire a voice signal using the microphone; acquire context information associated with at least one of the electronic device or the user; determine a first domain set of the plurality of domain sets based on at least the context information; and perform an operation corresponding to the voice signal based on the determined first domain set.

The electronic device according to an example embodiment may further include: at least one sensor (e.g., the sensor 176 of FIG. 4), and the at least one processor may be configured to acquire context information associated with the electronic device using the at least one sensor.

According to an example embodiment, the context information may include at least one of a location of the electronic device, a time, a day, a date, and an occupation of the user of the electronic device.

The electronic device according to an example embodiment may further include: a communication circuit (e.g., the communication circuit 190 of FIG. 4), and the communication circuit may communicate with a server storing the plurality of domain sets and a plurality of domain sets different from the plurality of domain sets.

In an example embodiment, the communication circuit may receive a second domain set different from the first domain set based on the context information and the voice signal among the different plurality of domain sets, and the at least one processor may perform an operation corresponding to the voice signal based on the second domain set.

According to an example embodiment, in response to downloading or executing a designated application, the at least one processor may output a guidance associated with a voice service corresponding to the designated application, and may receive data necessary for the voice service from the server using the communication circuit.

The electronic device according to an example embodiment may further include: a display (e.g., the display 161 of FIG. 4), and the at least one processor may provide a guidance based on the first domain set through the display.

According to an example embodiment, the at least one processor may be configured to: acquire additional context information different from the context information associated with at least one of the electronic device or the user, and the communication circuit may receive the second domain set different from the first domain set based on the additional context information and the voice signal among the different plurality of domain sets, and the processor may perform an operation corresponding to the voice signal based on the second domain set.

According to an example embodiment, the first domain set may further include a plurality of capsules, and the at least one processor may be configured to delete at least one of the plurality of capsules based on the user's request or add a capsule different from the plurality of capsules to the first domain set.

As described above, an example operating method of the electronic device according to an embodiment may include: acquiring a voice signal using a microphone of an electronic device; acquiring context information associated with at least one of the electronic device and the user; determining a first domain set among a plurality of domain sets stored in a memory of the electronic device based on at least the context information; and performing an operation corresponding to the voice signal based on the determined first domain set.

According to an example embodiment, the context information may include at least one of a location of the electronic device, a time, a day, a date, and an occupation of the user of the electronic device.

According to an example operating method of the electronic device may further include: receiving, from a server, a second domain set different from the first domain set based on the context information and the voice signal; and performing an operation corresponding to the voice signal based on the second domain set.

According to an example operating method of the electronic device may further include: outputting, in response to downloading or executing a designated application, a guidance associated with a voice signal corresponding to the designated application and updating the voice service.

According to an example embodiment, the operation corresponding to the voice signal may include outputting a guidance corresponding to the voice signal based on the first domain set through a display of the electronic device.

The operating method of the electronic device according to an example embodiment may further include: acquiring additional context information different from the context information associated with the electronic device or the user; receiving the second domain set different from the first domain set from the server based on the additional context information and the voice signal; and performing an operation corresponding to the voice signal based on the second domain set.

As described above, the electronic device according to an example embodiment may include: a microphone (e.g., the microphone 151 of FIG. 4), a memory (e.g., the memory 130 of FIG. 4) storing a plurality of domain sets; a communication circuit (e.g., the communication circuit 190 of FIG. 4) configured to communicate with a server; and at least one processor (e.g., the processor 120 of FIG. 4) electrically connected to the microphone and the memory, wherein the at least one processor may be configured to: acquire a voice signal using the microphone; acquire context information associated with at least one of the electronic device or the user; receive, from the server, the context information and a first domain set corresponding to the voice signal using the communication circuit; and store the first domain set in the memory and perform an operation corresponding to the voice signal based on the first domain set.

The electronic device according to an example embodiment may further include: at least one sensor (e.g., the sensor 176 of FIG. 4), and the at least one processor may acquire context information associated with the electronic device using the at least one sensor.

According to an example embodiment, the context information may include at least one of a location of the electronic device, a time, a day, a date, and an occupation of the user of the electronic device.

According to an example embodiment, the electronic device may further include a display (e.g., the display 161 of FIG. 4), and the at least one processor may be configured to provide a guidance corresponding to the voice signal through the display based on the first domain set.

The at least one processor according to an example embodiment may be configured to: output, in response to downloading or executing a designated application, a guidance associated with a voice service corresponding to the designated application; and receive data necessary for the voice service from the server using the communication circuit. While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. An electronic device comprising:
   a microphone;
   memory storing instructions, a plurality of domain sets and a capsule database including a plurality of capsules corresponding to the plurality of domain sets, the plurality of capsules including relationships between a plurality of concepts and actions corresponding to the plurality of domain sets; and at least one processor, comprising processing circuitry, electrically connected to the microphone and the memory, wherein the instructions, when executed by the at least one processor individually or collectively, cause the electronic device to:

acquire a voice signal using the microphone;

acquire context information associated with at least one of the electronic device or a user;

determine whether domain sets are identified from among the plurality of domain sets stored in the memory based on the context information;

when a single domain set is identified among the plurality of domain sets based on the context information, determine a first domain set as the identified single domain set;

when more than one domain set are identified among the plurality of domain sets based on the context information, select the first domain set among the identified more than one domain set based on an utterance of the user in the voice signal;

when no domain sets are identified among the plurality of domain sets based on the context information:
  transmit, to a server, the context information and the voice signal,
  receive, from the server, the first domain set corresponding to the context information and the voice signal;

generate a plan including a plurality of operations for processing a task corresponding to the voice signal based on the determined first domain set and capsules corresponding to the determined first domain set; and perform the plurality of operations corresponding to the voice signal.

2. The electronic device of claim 1, further comprising:
at least one sensor,
wherein the instructions, when executed by the at least one processor individually or collectively, cause the electronic device to acquire context information associated with the electronic device using the at least one sensor.

3. The electronic device of claim 1, wherein the context information includes at least one of a location of the electronic device, a time, a day, a date, and an occupation of the user of the electronic device.

4. The electronic device of claim 1, further comprising:
a communication circuit,
wherein the communication circuit communicates with the server storing the plurality of domain sets and a plurality of domain sets different from the plurality of domain sets.

5. The electronic device of claim 4, wherein:
the communication circuit receives a second domain set different from the first domain set based on the context information and the voice signal among the different plurality of domain sets, and
the at least one processor performs an operation corresponding to the voice signal based on the second domain set.

6. The electronic device of claim 5, wherein the instructions, when executed by the at least one processor individually or collectively, cause the electronic device to:

acquire additional context information different from the context information associated with at least one of the electronic device or the user;

receive the second domain set different from the first domain set based on the additional context information and the voice signal among the different plurality of domain sets; and perform an operation corresponding to the voice signal based on the second domain set.

7. The electronic device of claim 4, wherein the instructions, when executed by the at least one processor individually or collectively, cause the electronic device to:
output, in response to downloading or executing a designated application, a guidance associated with a voice service corresponding to the designated application, and
receive data necessary for the voice service from the server using the communication circuit.

8. The electronic device of claim 1, further comprising:
a display,
wherein the instructions, when executed by the at least one processor individually or collectively, cause the electronic device to provide a guidance based on the first domain set through the display.

9. The electronic device of claim 1,
wherein the instructions, when executed by the at least one processor individually or collectively, cause the electronic device to delete at least one of the plurality of capsules based on the user's request or add a capsule different from the plurality of capsules to the first domain set.

10. A method of operating an electronic device including a memory storing a plurality of domain sets and a capsule database including a plurality of capsules corresponding to the plurality of domain sets, the plurality of capsules including relationships between a plurality of concepts and actions corresponding to the plurality of domain sets, the method comprising:

acquiring a voice signal using a microphone of an electronic device;

acquiring context information associated with at least one of the electronic device and a user;

determining whether domain sets are identified from among the plurality of domain sets stored in the memory based on the context information;

when a single domain set is identified among the plurality of domain sets based on the context information, determining a first domain set as the identified single domain set;

when more than one domain set are identified among the plurality of domain sets based on the context information, selecting the first domain set among the identified more than one domain set based on an utterance of the user in the voice signal;

when no domain sets are identified among the plurality of domain sets based on the context information:
  transmit, to a server, the context information and the voice signal;
  receiving, from the server, the first domain set corresponding to the context information and the voice signal;

generating a plan including a plurality of operations for processing a task corresponding to the voice signal based on the determined first domain set and capsules corresponding to the determined first domain set; and performing the plurality of operations corresponding to the voice signal.

11. The method of claim 10, wherein the context information includes at least one of a location of the electronic device, a time, a day, a date, and an occupation of the user of the electronic device.

12. The method of claim 10, further comprising:
receiving, from the server, a second domain set different from the first domain set based on the context information and the voice signal; and
performing an operation corresponding to the voice signal based on the second domain set.

13. The method of claim 12, further comprising:
acquiring additional context information different from the context information associated with the electronic device or the user;
receiving the second domain set different from the first domain set from the server based on the additional context information and the voice signal; and
performing an operation corresponding to the voice signal based on the second domain set.

14. The method of claim 10, further comprising:
outputting, in response to downloading or executing a designated application, a guidance associated with a voice service corresponding to the designated application; and
updating the voice service.

15. The method of claim 10, wherein the operation corresponding to the voice signal comprises outputting a guidance corresponding to the voice signal based on the first domain set through a display of the electronic device.

16. An electronic device comprising:
a microphone;
a memory, instructions storing a plurality of domain sets and a capsule database including a plurality of capsules corresponding to the plurality of domain sets, the plurality of capsules including relationships between a plurality of concepts and actions corresponding to the plurality of domain sets;
a communication circuit configured to communicate with a server; and
at least one processor, comprising processing circuitry, electrically connected to the microphone and the memory,
wherein the instructions, when executed by the at least one processor individually or collectively, cause the electronic device to:
acquire a voice signal using the microphone;
acquire context information associated with at least one of the electronic device or a user;
determine whether one or more domain sets can be identified from among the plurality of domain sets stored in the memory based on the context information;
in response to determining that the one or more domain sets can be identified from among the plurality of domain sets stored in the memory based on the context information:
identify one or more domain sets from among the plurality of domain sets stored in the memory based on the context information;
when a single domain set is identified based on the context information, determine a first domain set as the identified single domain set;
when more than one domain set are identified based on the context information, select the first domain set among the identified more than one domain set based on an utterance of the user in the voice signal;
in response to determining that at least one domain set cannot be identified from among the plurality of domain sets stored in the memory based one the context information:
transfer the context information and the voice signal to the server,
receive, from the server, the first domain set corresponding to the context information and the voice signal using the communication circuit; and
store the first domain set in the memory;
generate a plan including a plurality of operations for processing a task corresponding to the voice signal based on the determined first domain set and capsules corresponding to the determined first domain set; and
perform the operations corresponding to the voice signal.

17. The electronic device of claim 16, further comprising:
at least one sensor,
wherein the at least one processor acquires context information associated with the electronic device using the at least one sensor.

18. The electronic device of claim 16, wherein the context information includes at least one of a location of the electronic device, a time, a day, a date, and an occupation of the user of the electronic device.

19. The electronic device of claim 16, further comprising:
a display,
wherein the instructions, when executed by the at least one processor individually or collectively, cause the electronic device to provide a guidance corresponding to the voice signal through the display based on the first domain set.

20. The electronic device of claim 19, wherein the instructions, when executed by the at least one processor individually or collectively, cause the electronic device to:
output, in response to downloading or executing a designated application, a guidance associated with a voice service corresponding to the designated application; and
receive data necessary for the voice service from the server using the communication circuit.

* * * * *